(12) United States Patent
Hoshing et al.

(10) Patent No.: US 9,680,909 B2
(45) Date of Patent: Jun. 13, 2017

(54) METHOD AND SYSTEM FOR PROVIDING ELECTRONIC NOTIFICATION

(75) Inventors: Deepak Hoshing, Bangalore (IN); Arunnima Balakrishnan Senakumari, Keralal (IN); Dinesh Chennabasavan Thogarapalli, Bangalore (IN)

(73) Assignee: Infosys Limited, Bangalore (IN)

( * ) Notice: Subject to any disclaimer, the term of this patent is extended or adjusted under 35 U.S.C. 154(b) by 184 days.

(21) Appl. No.: 13/980,511

(22) PCT Filed: Jan. 31, 2011

(86) PCT No.: PCT/IN2011/000068
§ 371 (c)(1),
(2), (4) Date: Aug. 7, 2013

(87) PCT Pub. No.: WO2012/104856
PCT Pub. Date: Aug. 9, 2012

(65) Prior Publication Data
US 2013/0332571 A1    Dec. 12, 2013

(51) Int. Cl.
*G06F 15/173* (2006.01)
*H04L 29/08* (2006.01)
(Continued)

(52) U.S. Cl.
CPC ............. *H04L 67/02* (2013.01); *G06Q 10/06* (2013.01); *G06Q 10/10* (2013.01); *G06Q 30/01* (2013.01)

(58) Field of Classification Search
CPC ...... G06F 11/327; G06F 9/542; H04L 12/587; H04L 51/24; G06Q 10/107; G06Q 10/10; G06Q 10/06; G06Q 30/01
(Continued)

(56) References Cited

U.S. PATENT DOCUMENTS 6,751,657 B1   6/2004 Zothner
7,317,929 B1 * 1/2008 El-Fishawy et al. ......... 455/466
(Continued)

OTHER PUBLICATIONS

Office Action from ARIPO Patent Application AP/P/2013/007063, May 19, 2016, pp. 1-5.
(Continued)

*Primary Examiner* — Phuoc Nguyen
(74) *Attorney, Agent, or Firm* — LeClairRyan, a Professional Corporation

(57) ABSTRACT

A system and method for generating an alert mechanism corresponding to an organizational process. comprising one or more core systems is provided. The method includes identifying one or more events corresponding to the organizational process from one or more databases. The method further includes scanning operations and properties associated with and recorded against each object. Input and output parameters associated with each operation are determined and recorded. Thereafter, a plurality of alert messages are registered using one or more alert message categories and associated input and output parameters. The system of the present invention is configured to accept subscriptions from one or more customers for receiving alert messages. Relevant information for generating alert messages is sent to each core system of the organizational process in and alert messages are then generated based on registration and subscription information.

18 Claims, 12 Drawing Sheets

(51) Int. Cl.
  *G06Q 10/06* (2012.01)
  *G06Q 10/10* (2012.01)
  *G06Q 30/00* (2012.01)

(58) Field of Classification Search
  USPC ........................................................ 709/223
  See application file for complete search history.

(56) References Cited

U.S. PATENT DOCUMENTS

| | | | |
|---|---|---|---|
| 8,161,330 B1* | 4/2012 | Vannatter et al. | 714/48 |
| 8,181,856 B1* | 5/2012 | Folk et al. | 235/379 |
| 8,397,108 B1* | 3/2013 | Vannatter et al. | 714/57 |
| 8,550,338 B1* | 10/2013 | Nichols et al. | 235/379 |
| 2002/0165849 A1* | 11/2002 | Singh et al. | 707/1 |
| 2006/0022048 A1* | 2/2006 | Johnson | 235/462.1 |
| 2006/0224400 A1 | 10/2006 | Chkodrov et al. | |
| 2007/0050510 A1* | 3/2007 | Jiang | 709/227 |
| 2007/0080223 A1* | 4/2007 | Japuntich | 235/439 |
| 2007/0174448 A1* | 7/2007 | Ahuja et al. | 709/224 |
| 2007/0293958 A1* | 12/2007 | Stehle et al. | 700/30 |
| 2008/0109370 A1* | 5/2008 | Moshir et al. | 705/64 |
| 2008/0147516 A1* | 6/2008 | Rousso et al. | 705/27 |
| 2008/0167000 A1* | 7/2008 | Wentker et al. | 455/408 |
| 2008/0184270 A1* | 7/2008 | Cole et al. | 719/318 |
| 2008/0290154 A1* | 11/2008 | Barnhardt et al. | 235/379 |
| 2009/0031006 A1* | 1/2009 | Johnson | 709/218 |
| 2009/0070230 A1* | 3/2009 | Silverstein et al. | 705/26 |
| 2009/0177562 A1* | 7/2009 | Peace et al. | 705/30 |
| 2010/0095357 A1* | 4/2010 | Willis et al. | 726/6 |
| 2010/0153247 A1* | 6/2010 | DiPaolo et al. | 705/34 |
| 2010/0241535 A1* | 9/2010 | Nightengale et al. | 705/30 |
| 2010/0287215 A1* | 11/2010 | Lasensky et al. | 707/805 |
| 2011/0022560 A1* | 1/2011 | Breiter | G06N 5/04 706/47 |
| 2011/0131131 A1* | 6/2011 | Griffin et al. | 705/38 |

OTHER PUBLICATIONS

International Search Report for PCT/IN2011/000068, mailed May 19, 2011.

\* cited by examiner

| | |
|---|---|
| Alert Id * | DEP_MAT |
| Alert Description * | Deposit Maturity |
| Alert Category * | Deposits |
| Expiry Period in Days * | 5 |
| Output Parameters * | MAT_DT |
| Host ID * | Core |
| Alert Priority * | 1 |
| Alert Mode * | Batch |
| Alert User * | External Alert |
| Attachment Required * | No |

| Parameter ID | Display Name | Visibility | Display Type | Field Type | Size | Default Value |
|---|---|---|---|---|---|---|
| AC | | No | Text Box | String | | |
| | | No | Text Box | String | | |

| Delivery Channels | Alert Subject | Alert Message |
|---|---|---|
| E-CHANNELS | Deposit Maturity | Dear $$Name, Your Account $$AC |
| EMAIL | Deposit Maturity | Dear $$Name, Your Account $$AC |
| SMS | | Dear $$Name, Your Account $$AC |
| FAX | Deposit Maturity | Dear $$Name, Your Account $$AC |

FIG. 9

Alerts > Personalize Alerts

Select Channels for your alert preferences

Customer Level Alerts

| Alert Description | Welcome Screen | E-MAIL | SMS | VOICE | FAX | Frequency |
|---|---|---|---|---|---|---|
| Login Password Expiry | ☑ | ☑ | ☐ | ☐ | ☐ | |
| Transaction Password Expiry | ☑ | ☐ | ☑ | ☐ | ☐ | |
| Number of Unread Mails | ☑ | ☐ | ☐ | ☑ | ☐ | |

Do you want to set same minimum A/C balance for all A/Cs?  Amount: [  ] OK

Current Account Alerts

| Alert Description | Set Amount | Welcome Screen | E-MAIL | SMS | VOICE | FAX | Frequency |
|---|---|---|---|---|---|---|---|
| Minimum Balance A\C 40567348 | [  ] | ☑ | ☑ | ☐ | ☐ | ☐ | Weekly ▸ |
| Minimum Balance A\C 73200251 | [  ] | ☑ | ☑ | ☐ | ☐ | ☐ | Weekly ▸ |
| Large Debit/Credit A\C 4885722 | [  ] | ☑ | ☑ | ☐ | ☐ | ☐ | Weekly ▸ |
| Large Debit/Credit A\C 1358572 | [  ] | ☑ | ☑ | ☐ | ☐ | ☑ | Weekly ▸ |

FIG. 10

METHOD AND SYSTEM FOR PROVIDING ELECTRONIC NOTIFICATION

This application is a national stage application under 35 U.S.C. §371 of PCT Application No. PCT/IN2011/000068, filed Jan. 31, 2011, which is hereby incorporated by reference in its entirety.

FIELD OF INVENTION

The present invention relates generally to the field of electronic notification systems. More particularly, the present invention employs a system and method for implementing generation and delivery of electronic alert messages across multiple delivery channels for various processes within an organization.

BACKGROUND OF THE INVENTION

Presently, organizations are increasingly using Information Technology (IT) for providing enhanced customer satisfaction. An important aspect of providing enhanced customer satisfaction includes making available useful information related to products and services to customers promptly and efficiently. In order to provide timely notification to customers, electronic information is usually sent to interested customers when certain specific events related to a product or service take place or are likely to take place in near future. For example, in the case of a banking customer, electronic alert messages are provided to customers for informing the customer about debit transactions on their accounts. In another example, users of a computer network may be informed about a server downtime in the network by a network monitoring tool.

For incorporating addition of an alert mechanism with respect to a particular organizational process, specific changes are required to be made in the software system associated with the process so that timely alert messages can be sent to customers. Diverse business processes implemented by software systems within organizations may incorporate varied software elements that comprise specific software objects and operations. For example, a bank may have a software system for customer accounts implementing software objects pertaining to operations such as debit transactions, credit transactions, cheque clearing, account balance monitoring etc. A completely different business organization such as an internet service provider may have a software system for its customers implementing software objects pertaining to operations such as mobile device registration and subscription, call history detail records, customer account maintenance etc. For employing an alert message delivery mechanism for the aforementioned organizational processes, changes are required to be made specific to the processes employed within the organizations. There exists a need for a system and method to minimize changes to various organizational processes in order to generate and execute specific alert mechanisms. Further, for a particular organizational process, different customers may have requirements for being alerted for different events through different delivery channels at different preferred times. For example, a banking customer A may want to be alerted in the event of a debit of more than USD 1000, whereas another customer B may want to be alerted only when a debit of more than USD 10,000. Thus, there exists a need for a system and method to provide a mechanism to customers for specifying types, frequency and channels for delivering alert messages required by them.

SUMMARY OF THE INVENTION

A system and method for generating alert mechanisms specific to organizational processes is provided. The method for generating an alert mechanism includes registration, subscription and generation of alert messages having a primary step of identifying one or more events corresponding to the organizational process from one or more databases associated with the organizational process. Identification of the one or more events includes identifying independent objects associated with each core system of the organizational process. The method further includes scanning at least one of operations and properties associated with and recorded against each object and then determining and recording input and output parameters associated with each operation. Thereafter, a plurality of alert messages are registered through user interface using one or more alert message categories and associated input and output parameters. Following the registration of alert messages, subscriptions are accepted from one or more customers for receiving alert messages. Thereafter, relevant information is sent to each core system for generation of alert messages. Using the registration and subscription information, one or more alert messages are generated.

In various embodiments of the present invention, relevant information corresponding to each core system includes at least one of objects belonging to customers subscribed to receive alert messages, operations or property changes for generation of alert messages and customer specific values of input and output parameters.

In various embodiments of the present invention, scanning operations associated with and recorded against each object includes aggregating one or more operations occurring on a particular object and recording a value associated with the one or more operations.

In an embodiment of the present invention, scanning operations associated with each object includes predicting one or more operations by scanning object tables for identifying recorded dates and diary tables maintained by organizational databases.

In an embodiment of the present invention, scanning at least one of operations and properties associated with each object includes identifying properties associated with identified independent objects that may warrant sending an alert message, and recording the identified properties.

In various embodiments of the present invention, registering an alert message includes specifying one or more attributes necessary for specifying one or more attributes necessary for generation, subscription and delivery of alert messages. The one or more attributes include input and output parameters such as account number, threshold limits, account balance, bill due date, bill amount due, priority of alert message, mode of generation of alert message, expiry period of alert message and static text of alert message.

In an embodiment of the present invention, subscriptions are accepted from one or more customers manually through a user interface.

In an embodiment of the present invention, subscriptions are accepted from one or more customers for receiving an alert message is carried out using Application Programming Interfaces published by the system procedurally.

In an embodiment of the present invention, subscription information corresponding to one or more customers comprises at least one of information regarding preferences for receiving alert messages such as choice of delivery channels, frequency of receiving alert messages and threshold limits for account transactions.

The method for generating alert mechanisms includes publishing one or more generated alert messages by arranging the messages in a database table and marking the messages for delivery. The method further includes sending the one or more alert messages to the one or more customers based on alert message registration and subscription information.

In an embodiment of the present invention, the step of sending the one or more alert messages includes polling the database table for identifying generated alert messages. The method includes personalizing each identified alert message for adapting the message in accordance with parameters and preferences set during alert message registration and subscription. The method further includes extracting information related to delivery channels for sending each alert message and assigning a priority value to each alert message. Subsequently, the one or more alert messages are consolidated based on one or more conditions. The alert messages are then sent in order of priority to individual channels in order to be delivered to intended recipients. In an embodiment of the present invention, information related to delivery channels is extracted from customer information system data within databases associated with the organizational process. The information related to delivery channels includes at least one of email address, fax number, mobile number and telephone number.

In various embodiments of the present invention, adapting alert message in accordance with parameters and preferences includes replacing field markers within alert message with specified parameter values and activating preferences specified for the alert message.

In an embodiment of the present invention, priority value is assigned to each alert message by computing a priority value based on priority indicated during alert message registration and subscription. Priority value can also be assigned by deriving customer priority information stored in databases associated with organizational process and time of occurrence of event corresponding to the alert message.

In an embodiment of the present invention, prior to consolidating one or more alert messages the method includes writing alert messages to publication table along with associated information required for sending alert messages. The information includes at least one of unique identifier for each message, type of alert message, alert message subscription identifier, customer identifier, delivery channel address, transformed alert message subject, file attachment location, alert message expiry period and priority of published alert message. The publication table is then sorted in descending order of priority.

In an embodiment of the present invention, alert messages stored in publication table that are beyond alert message expiry period are deleted.

In various embodiments of the present invention, the step of generating one or more alert messages includes scanning organizational database tables for tracing transactions related to operations associated with each object. The method further includes confirming that an operation performed corresponding to a transaction is being monitored as part of alert message registration and subscription. It is then determined whether object corresponding to the operation being monitored belongs to a customer and whether the operation qualifies for generating an alert message. If it is determined that the operation qualifies for generating an alert message, the alert message is generated.

In an embodiment of the present invention, organizational database tables are scanned in real time mode by putting triggers on the database tables. In another embodiment of the present invention, organizational database tables are scanned with high periodicity.

In various embodiments of the present invention, the step of determining whether object corresponding to the operation being monitored belongs to a customer includes identifying the customer who owns the object by obtaining information from system database and checking whether input parameter representing object instance identifier corresponding to the operation matches customer identification information.

In an embodiment of the present invention, determining whether the operation qualifies for generating an alert message comprises checking whether one or more conditions specified during alert message subscription and associated with the customer are conformed.

In an embodiment of the present invention, a system for generating an alert mechanism for registration, subscription and generation of alert messages includes a an alert solution module operationally connected to each core system of an organizational process and configured to facilitate registration and subscription of alert messages through a browser-based interface. The alert solution module is further configured to generate and process alert messages.

In various embodiments of the present invention, the system further includes an alert plug-in module associated with the each core system. The alert plug-in module is configured to scan at least one of operations, properties and objects associated with the each core system, and further configured to generate alert messages based on alert message registration and subscription information.

In an embodiment of the present invention, the alert solution module derives information from a customer information system for processing alert messages.

In various embodiments of the present invention, the generated alert messages are delivered through a delivery system comprising one or more communication channels. The delivery system comprises at least one of an SMS Gateway, an Email Gateway, a Fax Gateway and a Voice Gateway. The one or more communication channels may include email, mobile phone, fax and text-based messaging.

In various embodiments of the present invention, the alert solution module includes an alert registration module configured to provide user interfaces for performing alert message registration and an alert subscription module configured to provide user interfaces for performing alert message subscription. Further, the alert solution module includes an alert publishing module configured to publish and store generated alert messages to a database table for delivery to customers. Furthermore, the alert solution module includes a data store configured to store alert message registration and subscription information and a billing module configured to implement financial models used to charge customers for alert messages.

In various embodiments of the present invention, each alert plug-in module includes a data store configured to receive registration and subscription information from alert registration module and alert subscription module respectively. Further, the alert plug-in module includes an alert generation module configured to process the generation of alert messages.

BRIEF DESCRIPTION OF THE
ACCOMPANYING DRAWINGS

The present invention is described by way of embodiments illustrated in the accompanying drawings wherein:

FIGS. 9 and 10 depict browser-based user interfaces provided for performing alert message registration and subscription.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The system and method of the present invention implements provision of electronic alert messages to customers on events within an enterprise by integrating registration, subscription, generation and publishing functions. An interface capability is also provided to customers, where the customers can view all types of events that occur within organizational processes of an organization. Customers can then choose the alert messages that they would like to receive, personalize alert messages and select channels through which messages may be conveyed. The present invention provides an efficient mechanism to deliver alert messages wherein changes to existing legacy applications within an organizational process are kept to a bare minimum. Further, means to incorporate functions such as alert message consolidation and prioritization of alert messages is also provided.

Figure 1:
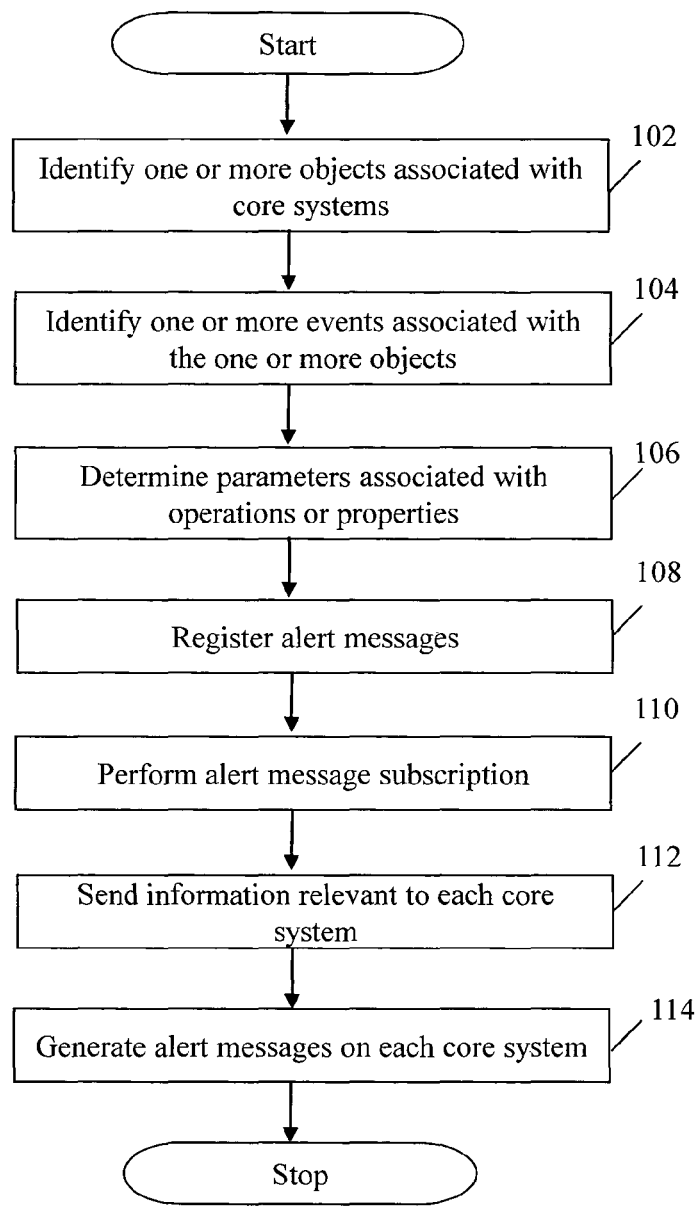
FIG. 1 illustrates a series of method steps for registering and generating an alert mechanism for an organizational process, in accordance with an embodiment of the present invention.

FIG. 1 illustrates a series of method steps for registering and generating an alert mechanism for an organizational process, in accordance with an embodiment of the present invention. In an embodiment of the present invention, an alert mechanism is generated for an organizational process taking into account specific elements associated with the process. Firstly, one or more events associated with an organizational process are identified from an organizational process database. The one or more events are events that are significant to the process that usually occur or are likely to occur and for which alert messages may be generated and for which customer may need to be informed proactively. An organizational process typically involves core systems with each core system comprising transaction tables and object tables. Object tables lists objects associated with a core system and transaction tables lists operations associated with objects. An example of an organizational process may be a banking system comprising core systems such as a Deposit System, a Loan System, Trade Finance, Internet Banking, Bill Processing System etc. Each core system has one or more objects associated with the system. For example, for the core system "Trade Finance" which includes transactions related to international trade, associated objects may include operations related to Bank Guarantee, Inland Bill, Forward contract, Documentary Credit etc. In an embodiment of the present invention, significant operations related to objects are events for which alert messages are sent.

The method steps for generating an alert mechanism associated with an organizational process include the following. At step 102, one or more objects associated with each core system of the organizational process are identified from organizational database tables. For example, for a "Deposit System" within the organizational process "Banking System", an independent object may be "Savings Account" on which an operation like "salary deposit" is performed. After identification of independent objects, objects corresponding to core systems are identified and listed in the system. In an exemplary embodiment of the present invention, core systems along with their corresponding objects are tabulated below:

TABLE 1

CORE SYSTEMS ALONG WITH CORRESPONDING OBJECTS

| Core system | Types of object |
| --- | --- |
| Deposit System | Current account, Savings account |
| Term Deposit system | Term deposit account |
| Loan System | Loan account, Overdraft account |
| Trade Finance | Inland or FX bill (clean) |
| Trade Finance | Forward Contract |
| Trade Finance | Documentary Credits |
| Trade Finance | Deferred Payment Guarantee |
| Trade Finance | Bank Guarantee |
| Internet Banking | Customer Information (channel and access specific) |
| Mail system | Mails |
| User Inbox | Referral |
| Bill Payment and presentment | Utility Bill |
| Operational CRM | Service request |
| CIF | Customer Information |

After the identification of objects, at step 104, one or more events for which alert messages are to be generated are identified. For identifying the one or more events, operations or properties associated with each object are scanned. The scanned operations are operations that a customer may be interested in i.e. operations that regularly occur. For example, for a "Current account" object for a banking system, regularly occurring operations may be Credit transaction, Debit transaction, cheque clearing etc. These operations of customer interest are operations for which electronic alert messages can be generated (hereinafter referred to as "Type A" alert messages).

In an embodiment of the present invention, after scanning the operations, operations corresponding to each object of each core system are listed and recorded in a table. In an exemplary embodiment of the present invention, for a "Banking System" organizational process, core systems along with types of objects and corresponding operations are illustrated in Table 2 below:

TABLE 2

SAMPLE OPERATIONS CORRESPONDING TO "TYPE A" ALERT MESSAGES

| Core system | Types of object | Operation |
| --- | --- | --- |
| Deposit System | Current account, Savings Account | Large debit/credit, Salary Credit Limit exceeded (temporary overdraft granted) Stop cheque Outward cheque cleared Inward cheque cleared Outward cheque returned |
| Mail system | Mail | New mail has arrived |
| Internet banking | Customer | User is enabled, disabled, locked |
| Term Deposit system | Term deposit | Deposit matured |
| Loan System | Loan | Loan sanctioned, Loan disbursed |
| Trade Finance | Bank guarantee | Bank guarantee expired |
| Trade Finance | FX or inland bill | Bill lodged (outward) |
| Trade Finance | Forward contract | Forward contract booked |
| Trade Finance | Documentary Credit | Documentary credit issued |
| Trade Finance | FX or inland bill | Lodged bill received |
| Trade Finance | Deferred Payment Guarantee | Deferred Payment Guarantee issued |
| Bill Payment and presentment | Utility Bill | Utility bill has been received |
| User Inbox | Referral | New entry has arrived and is waiting for approval |

In another embodiment of the present invention, in addition to receiving alert messages on individual operations, a customer may want to receive alert messages on operations aggregated on a particular object (hereinafter referred to as "Type B" alert messages). For example, for a Mail object associated with the organizational process "Mail system", a customer may want to see an alert message showing "number of unread emails" instead of or in addition to individual alert messages depicting subject line of each email that is received. In such an instance, as part of recording one or more operations, the one or more operations are first aggregated and a value associated with the one or more operations is recorded. For example, for the organizational process "Mail system", individual emails associated with a customer are aggregated and a count of total number of emails is recorded so that an alert message for aggregated operations can be generated and sent. In an exemplary embodiment of the present invention, Table 3 below illustrates aggregated operations and corresponding value associated with the operations for which an alert message can be generated.

TABLE 3

SAMPLE AGGREGATED OPERATIONS CORRESPONDING TO "TYPE B" ALERT MESSAGES

| Aggregated operations | Value associated with operations |
| --- | --- |
| Bank guarantee expired | No of bank guarantees expired |
| Bill lodged (outward) | No of bills lodged |
| Forward contract booked | No of forward contracts booked |
| Deferred Payment Guarantee issued | No of deferred payment guarantees issued |
| New mail has arrived | Number of new mails |
| New entry waiting for approval | Number of entries waiting for approval |

In yet another embodiment of the present invention, in addition to scanning operations, database tables associated with an organizational process are scanned in order to predict operations corresponding to objects that may take place in future (hereinafter referred to as "Type C" alert messages). This can be done by scanning object tables for important dates or diary tables maintained by databases of an organizational process. Operations that may take place in the future may include the following: For the organizational process "Internet Banking" and the corresponding object "Customer", a predicted operation may be "Logon password expiry date" or a "Transaction password expiry date". In an exemplary embodiment of the present invention, a table may be created and stored that illustrates objects associated with an organizational process along with their corresponding predicted operations, as shown below:

TABLE 4

SAMPLE PREDICTED OPERATIONS CORRESPONDING TO "TYPE C" ALERT MESSAGES

| Core system | Object | Predicted Operation |
| --- | --- | --- |
| Internet banking | Customer (user) | Logon password expiry date |
| | Customer | Transaction password expiry |
| | Customer | Login expiry (suspension) date |
| Term Deposit | Term deposit | Maturity date |
| Loan System | Loan | Repayment Date |
| Trade Finance | Bank Guarantee | Expiry date |
| Trade Finance | Inland and FX | Bill due date |

In yet another embodiment of the present invention, database tables of an organizational process may be scanned to identify properties associated with objects that may be significant enough to warrant an alert message to be sent to customers, when there is a change in the property (hereinafter referred to as "Type D" alert messages). This can be done by scanning object tables to identify important properties. For example, balance of a current account falling below a certain threshold value may warrant sending an alert message to the customer informing him/her about the same. Subsequent to the identification of properties, a table may be created and stored listing the objects along with corresponding identified properties. In an exemplary embodiment of the present invention, the table below illustrates a core system along with objects and properties, identified to be significant enough for alert messages to be sent:

TABLE 5

SAMPLE PROPERTIES CORRESPONDING TO "TYPE D" ALERT MESSAGES

| Core system | Types of object | Property |
|---|---|---|
| Deposit System | Current Account, Savings Account | Account Balance |
| Internet Banking | Customer Information | Access profile |

As described above, the one or more events required to generate alert messages include operations (Type A alert messages), aggregated operations (Type B alert messages), predicted operations (Type C alert messages) and property changes (Type D alert messages). Subsequent to identification of the one or more events for which alert messages may be sent, at step 106, input and output parameters corresponding to operations or properties are determined. The input and output parameters are used in filtering operations and properties for generating alert messages and personalization of messages for each customer. After the determination of input and output parameters, a table is generated that records and lists the one or more events related to operations or properties along with the corresponding input and output parameters. In an exemplary embodiment of the present invention, Table 6 below lists events and corresponding input and output parameters:

TABLE 6

| Core System | Events related to Operations/Properties | Input parameters | Output Parameters |
|---|---|---|---|
| Deposit System | Minimum Balance | Account Number Minimum Balance | Account Number Minimum balance |
| | Balance higher than limit (any account) | Limit | Account Number, Limit |
| | Large debit/credit (any account) | Threshold Amount | Account Number Threshold amount |
| | Limit exceeded (any account) | | Account Number Transaction limit |
| | Cheque stop (any account) | | Account Number Cheque Number Cheque Amount |
| | Outward cheque cleared (any account) | | Account Number Cheque Amount Cheque Number |
| | Inward cheque cleared (any account) | | Account Number |
| Internet banking | Logon password expiry | | Number of Days for expiry |
| | Transaction password expiry | | Number of Days for expiry |
| | Login expiry (suspension) | | Number of Days for suspension |
| | Access profile change | | New profile Change date/time |
| | User enabled | | User Enabled date/time |
| Mail system | No of unread mails | | No of unread mails |

At step 108, a user interface is used for registering alert messages. Registering an alert message includes specifying attributes necessary for generation, subscription and delivery of alert messages. Examples of attributes include type of delivery channel, type of alert message, account number, account threshold limits etc. Attributes may include input and output parameters associated with an alert message. Input parameters are inputs that may be required by an alert generation system for creation of alert messages such as, account number, threshold limits. Output parameters are configurable parameters that are recorded and set based on inputs and preferences specified by customers. Examples of output parameters may include factors such as Account Balance, Bill Due Date, Bill Amount Due etc. which are required to be captured for generating alert messages, since these parameters provide necessary information associated with the alert message to customers. Other attributes may include details such as priority of alert message, mode of generation of alert message i.e. batch, real time or quasi real time, expiry period of alert message, static text of the alert message etc. For example, an alert message such as "Cheque Bounced" would have a higher priority than an alert message informing about maturity of a Fixed Deposit.

In an embodiment of the present invention, for alert registration, a browser-based user interface is provided to an administrator who performs attribute specification which includes entering information about attributes' including, but not limited to, alert message identification, alert message classification, alert message expiry, input parameters required for generating alert message, alert message priority, static text and file attachment requirement for alert message, output parameters required for formatting message before sending it through delivery channels etc. In addition to attribute specification, in some cases supplementary information about attributes is also specified, for example, if the alert message mode is specified as batch mode, periodicity of generation of alert messages can be captured, such as, every day or every hour etc.

Attributes specified at the alert registration stage are then used at step 110 for subscription of alert messages. Subscription of alert messages is either carried out manually by the administrator through user interface or by third party applications interfaced to the present invention through Application Programming Interfaces (APIs) exposed by the system of the invention. In an embodiment of the present invention, for manually subscribing alert messages, an administrator enters information specific to customers who would like to receive an alert message. The administrator may also create customers for notification system manually through a user interface or through a batch program which uploads information automatically extracted from other system database. Further, an administrator also enters information specifying details about input and output parameters identified at step 106 for each customer. For example, for generation of alert message informing the customer about a Large debit/credit transaction, values of the parameters "Account Number" and "Threshold amount" for that customer are also specified.

Other information for subscribing an alert message that needs to be entered for a particular customer may include, but is not limited to, information regarding customer identification, delivery channel through which alert message is delivered, frequency of delivery of alert messages etc. In an embodiment of the present invention, instead of an administrator, a customer may specify attributes and preferences for receiving alert messages through channels including, but not limited to, e-Mails, Short Message Service(SMS), Voice and Fax. Other preferences specified may be language of choice for the message, "Do not Disturb" times for delivering alert messages etc.

In another embodiment of the present invention, during automatic subscription of alert messages, the system of the invention automatically specifies certain attribute details based on customer information stored in organizational database. For example, information such as "Account Number" is extracted from customer details stored in system database and automatically specified during alert message subscription.

Once alert message subscription is completed, attributes and parameters corresponding to the alert message are validated for field types and sizes captured. Information regarding alert message specification for each customer is then stored in an alert message subscription data store which is used for alert message generation. In various embodiments of the present invention, subscription data store includes generic attributes regarding each alert message captured during alert message registration at step 108 and customer-specific values for each alert message subscribed to by the customer at step 110.

At step 112, information relevant to each "core system" is sent to that core system for generation of alert messages. This information includes list of "core system" objects that belong to customers who have subscribed to alert messages at step 110, operations or property changes for which alert messages are to be generated based on threshold limits specified at step 108 and customer-specific values for input/output parameters required for alert message filtering and generation as specified at step 110. In an exemplary embodiment of the present invention, a core system such as, "Deposit System" receives information based on subscriptions made for events such as "Large debit/credit transactions".

At step 114, an alert plug-in associated with each core system generates alert messages corresponding to the one or more events in each core system. For example, for the core system: "Deposit System" for the organizational process "Banking System", alert messages may be generated for customer accounts for events such as "Large Debit/Credit Transaction", "Account Limit exceeded", "Cheque clearing", "Stop Cheque" etc. In an embodiment of the present invention, alert messages corresponding to a core system are generated based on information specified during alert message registration and subscription at steps 108 and 110.

Alert messages can be generated for "Type A alert messages", "Type B alert messages", "Type C alert messages" and "Type D alert messages". For the purpose of generating alert messages, organizational database tables are scanned for tracing operations for which alert message registration and subscription are performed at steps 108 and 110. In an embodiment of the present invention, information specified during subscription of alert messages and made available to core system at step 112 is referred to during scanning of the organizational database tables. An operation performed simultaneously along with the generation of alert messages includes inserting the generated alert messages in a "Generated Alerts" table and marking the messages as "Ready to Dispatch". Step 114 represents multiple flows for alert generation which differ for different types of alert messages. Alert generation flows for Type A alert messages, Type B alert messages, Type C alert messages and Type D alert messages are described in FIGS. 3, 4, 5 and 6 respectively. In various embodiments of the present invention, modes of generation of operation-based alert messages (Type A alert messages) or property-based alert messages (Type D alert messages) can be real-time, batch or quasi real-time based on criticality whereas mode of generation of aggregated operations (Type B alert messages) or predicted operations (Type C alert messages) can only be batch or quasi-real time.

Figure 2:
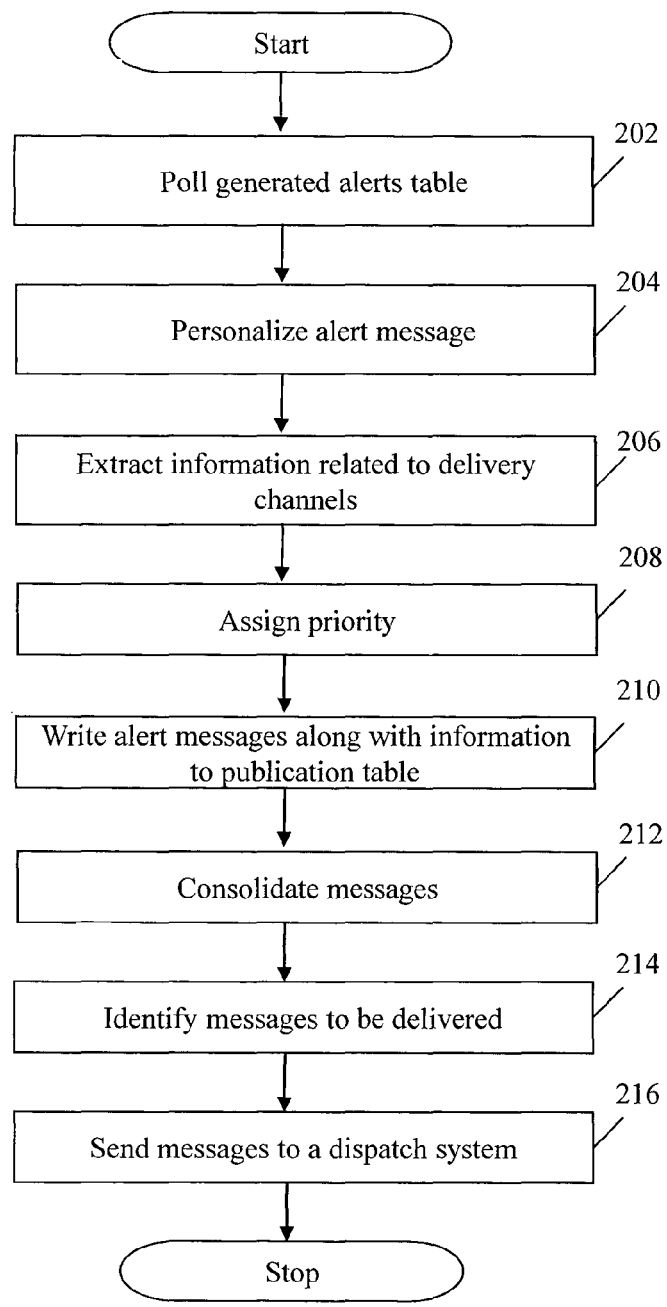
FIG. 2 depicts method steps illustrating publishing and sending of alert messages generated for an organizational process, in accordance with an embodiment of the present invention.

FIG. 2 depicts method steps illustrating publishing and sending of alert messages generated for an organizational process, in accordance with an embodiment of the present invention. Each core system within an organization includes a "Generated Alerts" table, wherein alert messages corresponding to events within the core system are stored, as and when they are generated. In an embodiment of the present invention, a stand-alone computer program is run for processing alert messages in order to deliver the messages to customers. At step 202, the stand-alone computer program periodically polls "Generated Alerts" table within each core system. Each alert message is then personalized at step 204 in order to adapt the message in accordance with parameters and preferences set during alert message registration and alert message subscription for the customer. In an embodiment of the present invention, for "Type D" alert messages, field markers within the alert message defined during alert message registration are replaced with values of output parameters generated as a result of a change in property associated with an object at step 114 during alert message generation. For example, for an alert message corresponding to a minimum balance operation, such as, "Balance of $$Account_Number is below your preferred minimum balance of $$Minimum_Balance and is currently $$Account_balance", which is defined to be sent through an SMS, the content of the message is modified to include values of parameters "$$Account_Number", "$$Minimum_Balance" and "$$Account_Balance" in the message. In an exemplary embodiment of the present invention, the alert message may be "Balance of ACCT1234 is below your preferred minimum balance of $100.00 and is currently $95.00".

After personalization of the message, at step 206, information related to delivery channels through which the message is to be sent is extracted. The stand-alone program uses 'views' on customer information system data or uses local copy of customer information data to find out customer's address on each of the delivery channels through which alert message is to be sent. Thereafter, at step 208, a priority value is assigned to each alert message. A priority value is computed for each alert message based on three factors. The first factor is priority of the alert message as indicated during alert message registration by the administrator. For example, during alert message registration, an alert message for a "Cheque bounced" may be assigned a higher priority than a. "Cheque cleared" message. A second factor for assigning priority includes deriving customer priority information stored in customer database based on "type" of customer. For example, "Gold" customers would have a higher priority than "Silver" customers. The third factor for assigning priority is time of occurrence of event corresponding to the alert message. If an event has already taken place, it will be considered to be of highest priority, say 9 on a scale of 1 to 9.

Following the assignment of priority to alert messages, at step 210, alert messages are written to the publication table along with associated information required to send the messages. Information written to publication table includes, but is not limited to, unique identifier for each message, type of alert message, alert message subscription identifier, customer, identifier, delivery channel address, transformed alert message subject obtained by substituting field markers, alert message transformed by substituting field markers, location of file attachment to be sent (in case a file attachment exists), "Do not disturb" time, priority of published alert message, alert message expiry period etc. Once alert messages have been published, publishing table is sorted in descending order of priority. After the sorting of messages, one or more alert messages are consolidated at step 212 based on the following two conditions: (1) The one or more alert messages are to be sent to the same user. (2) The messages are sent through the same channel and on the same channel address (e.g. phone number). The consolidation of messages may be constrained by the maximum characters allowed in a single message. For example, in case of SMS Alert Messages, a single SMS may have a limitation of 160 characters Email and fax channels however do not have a limitation on overall message length thus allowing any number of alert messages to be consolidated and sent as a single message to the customer.

After the processing of alert messages as described by the steps above, alert messages to be delivered are identified at step 214 and the status of identified alert messages are labeled as "ready to dispatch". Next, at step 216, a message delivery system takes the alert messages in order of priority and sends them across to individual channels to be delivered to recipients. A delivery channel for delivery of messages may include but are not limited to, push channels like Email, Fax, SMS, Voice and Pull Channels like Internet Banking, ATM etc. After an alert message is sent, it is marked as dispatched. Messages which are present beyond the alert message expiry period specified during alert message registration are deleted from publication table.

Figure 3:
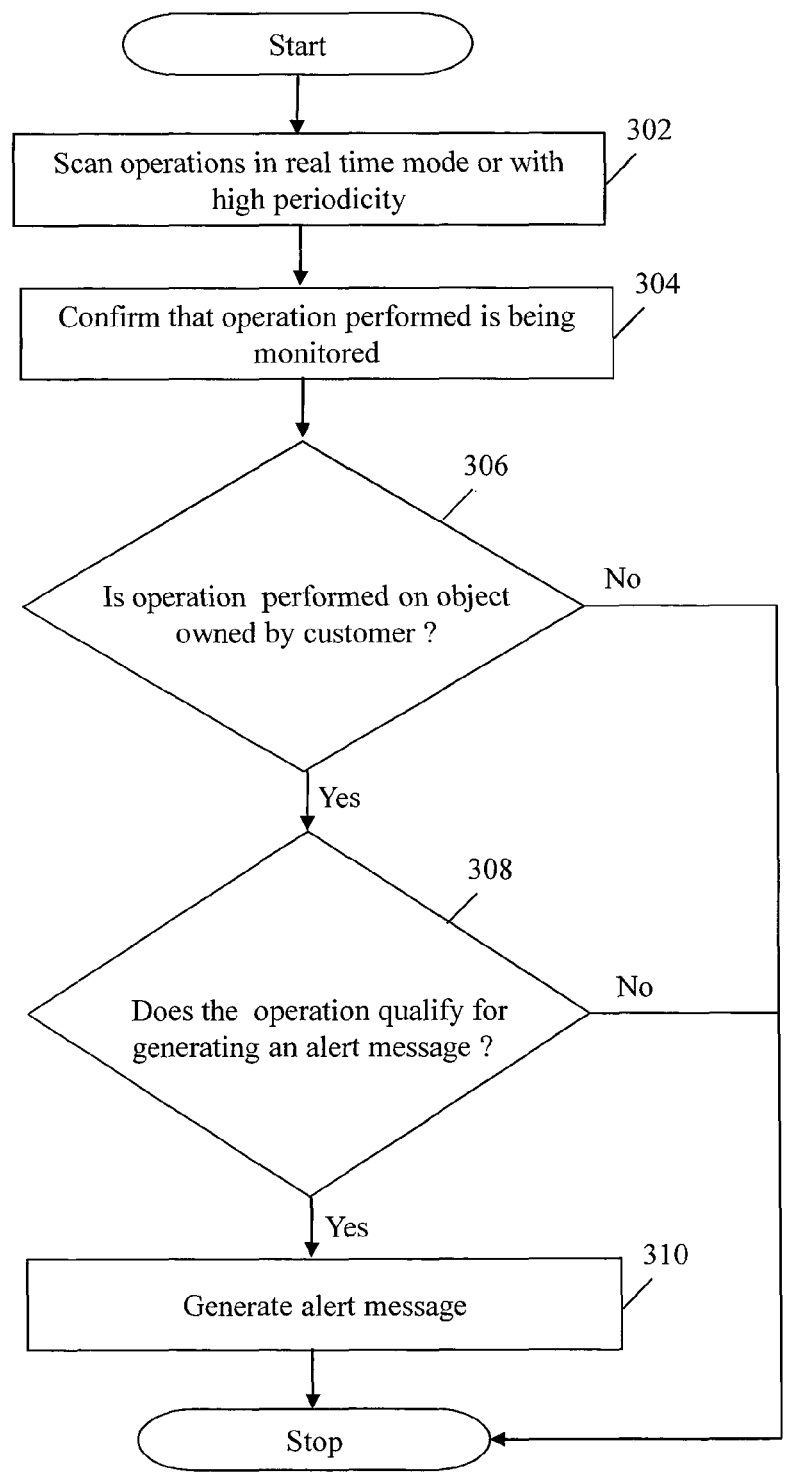
FIG. 3 shows a series of method steps carried out in accordance with an embodiment of the present invention for generating "Type A" alert messages.

FIG. 3 shows a series of method steps carried out for generating. "Type A" alert messages. "Type A" alert messages are messages corresponding to individual operations occurring on objects of a core system. In an exemplary embodiment of the present invention, during generation of an alert mechanism, as depicted in TABLE 2, operations for which "Type A" alert messages may be generated are tabulated along with corresponding objects. Information stored in this table is then used to scan organizational database tables either in real time or with high periodicity (in near real time). Examples of organizational database tables include, but are not limited to, tables such as audit tables, transaction log tables or events tables that record operations performed on required objects.

In an embodiment of the present invention, at step 302, organizational database tables are scanned in real time mode to trace transactions related to operations listed in TABLE 2. For scanning in real time mode, triggers are put on database tables. In another embodiment of the present invention, organizational database tables are scanned at high periodicity depending upon the nature of operation. After retrieving details of an operation related to a transaction, at step 304, it is confirmed whether an operation performed corresponding to a transaction is being monitored as part of an alert message registration. Further, at step 306, it is determined whether an object corresponding to the operation which is monitored for a customer actually belongs to the customer. For example, if the operation performed is "cheque bounced", it needs to be checked if the "account" on which cheque was being drawn is owned by the customer. In an embodiment of the present invention, this determination is made in two steps: First, identification of customer who owns account corresponding to the transaction is obtained from customer database and it is checked whether the identification information matches subscription information captured for the customer. Secondly, it is specifically checked whether an input parameter representing an object instance identifier corresponding to an operation, such as an account number matches the account number of the customer. At this stage, if it is determined that the object is not owned by customer, the process is interrupted and no alert message is generated. However, if it is determined that the object is owned by customer, at step 308, further filtering is done based on input parameters set during alert subscription in order to determine whether the operation qualifies for generating an alert message. An example of filtering would be checking whether a transaction amount is beyond the threshold set by a respective input parameter during alert message subscription. If it is determined that the operation qualifies for generating an alert message, at step 310, the alert message is generated after personalizing it using output parameters and other preferences set during alert subscription and inserted in a "Generated Alerts" table and then marked "Ready to Dispatch".

Figure 4:
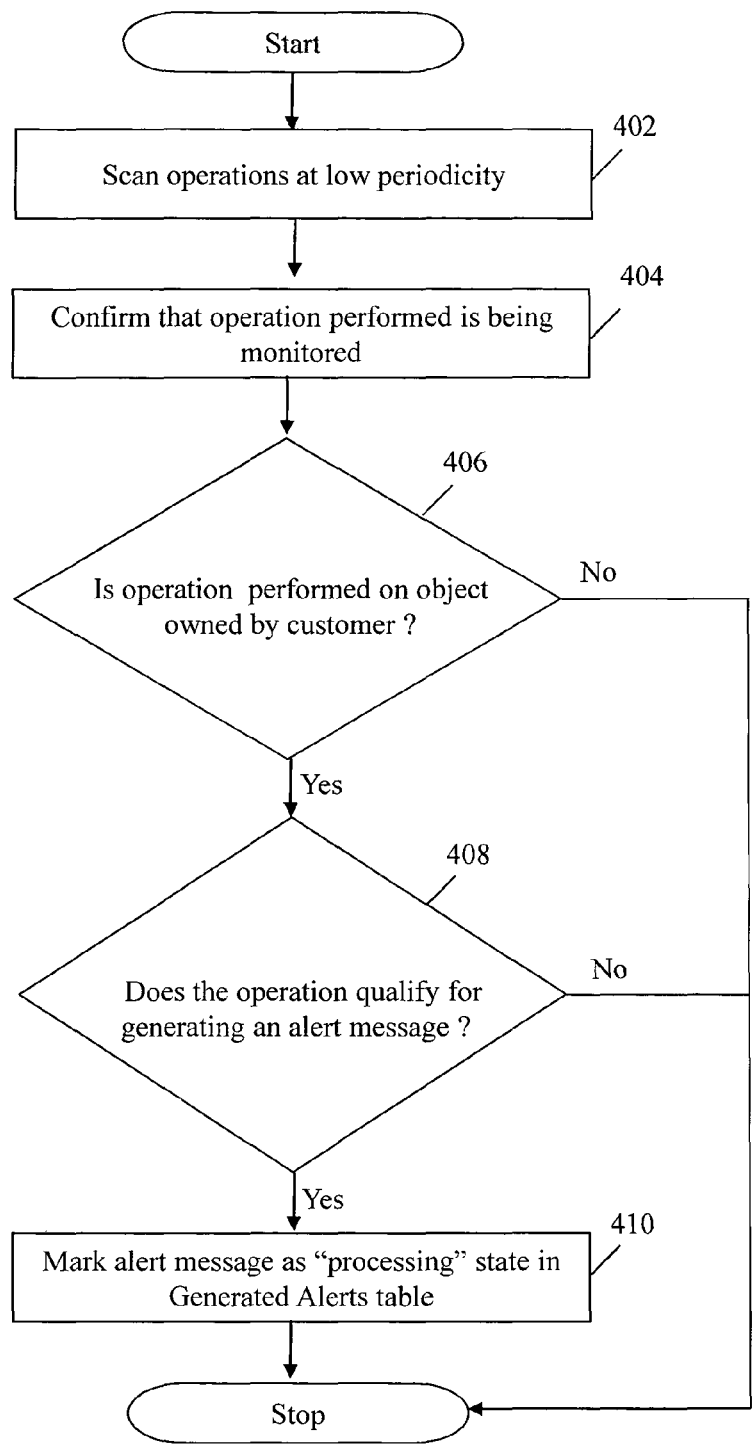
FIG. 4 shows a series of method steps carried out in accordance with an embodiment of the present invention for generating "Type B" alert messages.

FIG. 4 shows a series of method steps carried out in accordance with an embodiment of the present invention for generating "Type B" alert messages. As mentioned earlier, "Type B" alert messages are messages generated and delivered for aggregated operations performed for a particular object. For generating "Type B" alert messages, at step 402, operations within a database table are scanned at low periodicity, for example, once in a day. Scanning is performed to determine number of operations for a particular type done on a particular type of object. An example could be "Number of bank guarantees expired in a day".

After retrieving details of an operation corresponding to an object, at step 404, it is confirmed whether the operation performed is being monitored as part of alert message registration and subscription. Further, at step 406, it is determined whether the object whose operation is being monitored for a customer actually belongs to the customer. For example, if transactions for an operation "Bank guarantee expired" is monitored corresponding to the object "Bank guarantee", it is determined whether the object "Bank guarantee" actually belongs to the customer. Thereafter, similar to the generation of "Type A" alert messages, for generating a "Type B" alert message, it is further determined at step 408 whether the monitored operation qualifies for generating an alert message, based on input parameters set during alert message subscription.

At step 410, an alert message is generated for the monitored operation. The generated alert message is inserted in "Generated Alerts" table for keeping a record and is marked as "Processing" i.e. to specify that it is in a processing state. This is done since only a single alert message for aggregated operations is required to be sent for a "Type B" alert message. An output parameter counter corresponding to a record of aggregated operations is then updated as required. For example, the output parameter counter is incremented by one upon insertion of a generated alert message in the "Generated Alerts" table. Method steps described above are processed for a single operation corresponding to the object. At the end of scanning of all operations corresponding to an object within a certain period of time, for example, in a day, all operations corresponding to "Type B" alert message are processed and the alert message is marked as "Ready to Dispatch" after personalizing it using output parameters and other preferences set during alert message subscription.

Figure 5:
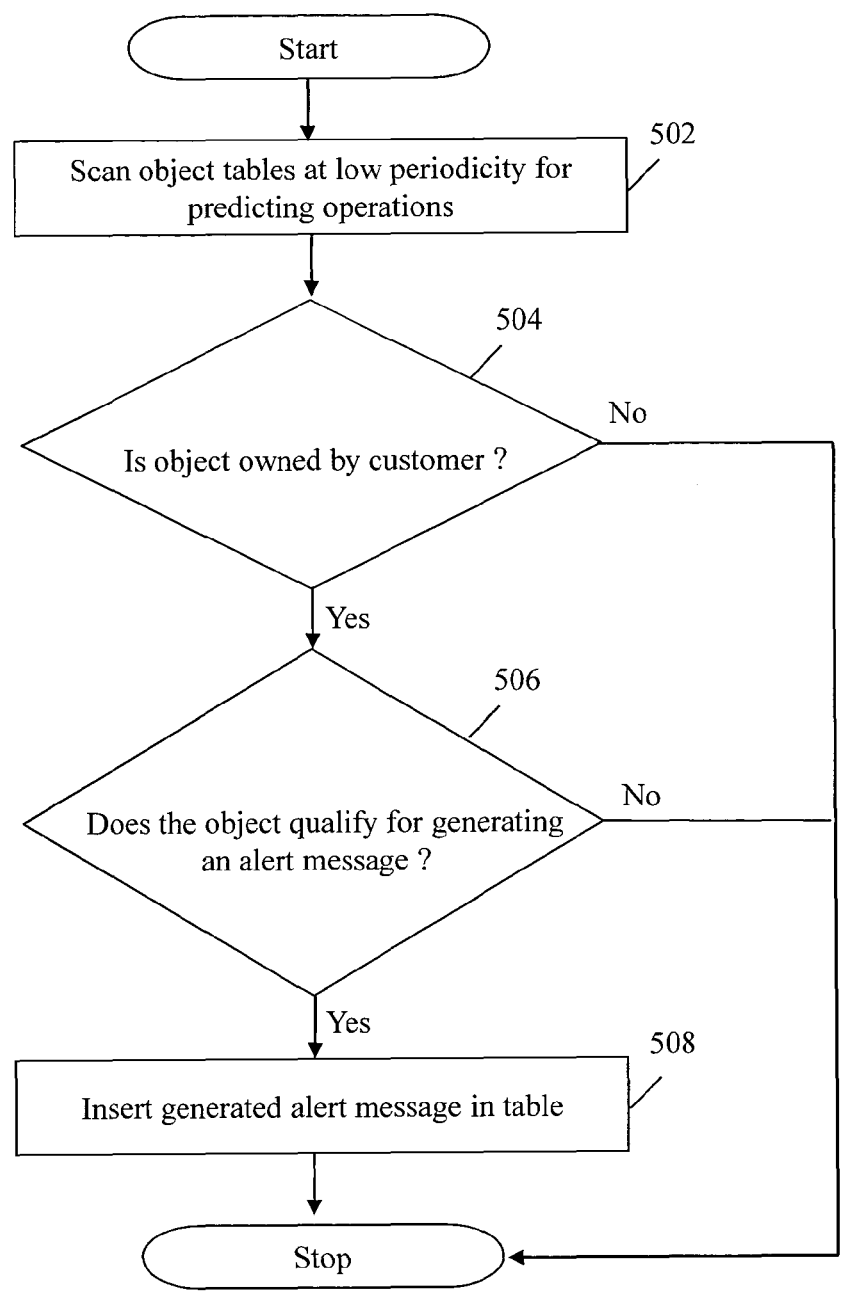
FIG. 5 shows a series of method steps carried out in accordance with an embodiment of the present invention for generating "Type C" alert messages.

FIG. 5 shows a series of method steps carried out in accordance with an embodiment of the present invention, for generating "Type C" alert messages. "Type C" alert messages are batch messages generated on predicted operations corresponding to objects. For the purpose of generating "Type C" alert messages, at step 502, object tables are scanned at low periodicity to discover events scheduled to arise after a particular period of time. Object tables are scanned only for those objects that are monitored i.e. those which are owned by customers who have subscribed to corresponding alert messages. For example, if a term deposit maturity alert message is to be processed, object tables are only needed to be scanned for deposits that belong to customers that have subscribed to "Term Deposit Maturity Alert". Hence, at step 504, it is determined whether a scanned object belongs to a customer. Firstly, identification of customer who owns the object is obtained and it is checked whether customer identification matches information entered during alert message subscription. Secondly, it is specifically checked whether an input parameter representing an object instance identifier, such as a term deposit account number matches the term deposit account number of the customer. Thereafter, at step 506 it is determined whether the scanned object qualifies for generating an alert message. For determining whether the scanned object qualifies for generating an alert message, filtering is done based on input parameters. For example, for a "Deposit Maturity" alert message, a check is performed to establish whether a deposit maturity date is on or before a current date plus notice period (in days) set by a respective input parameter set by a customer during alert message subscription.

If it is determined that the scanned object qualifies for generating an alert message, at step 508, the alert message is generated to inform the customer about a predicted operation. The generated alert message is then written to a "Generated Alerts" table and is marked "Ready to Dispatch" after personalizing it using output parameters and other preferences set during alert message subscription.

Figure 6A:
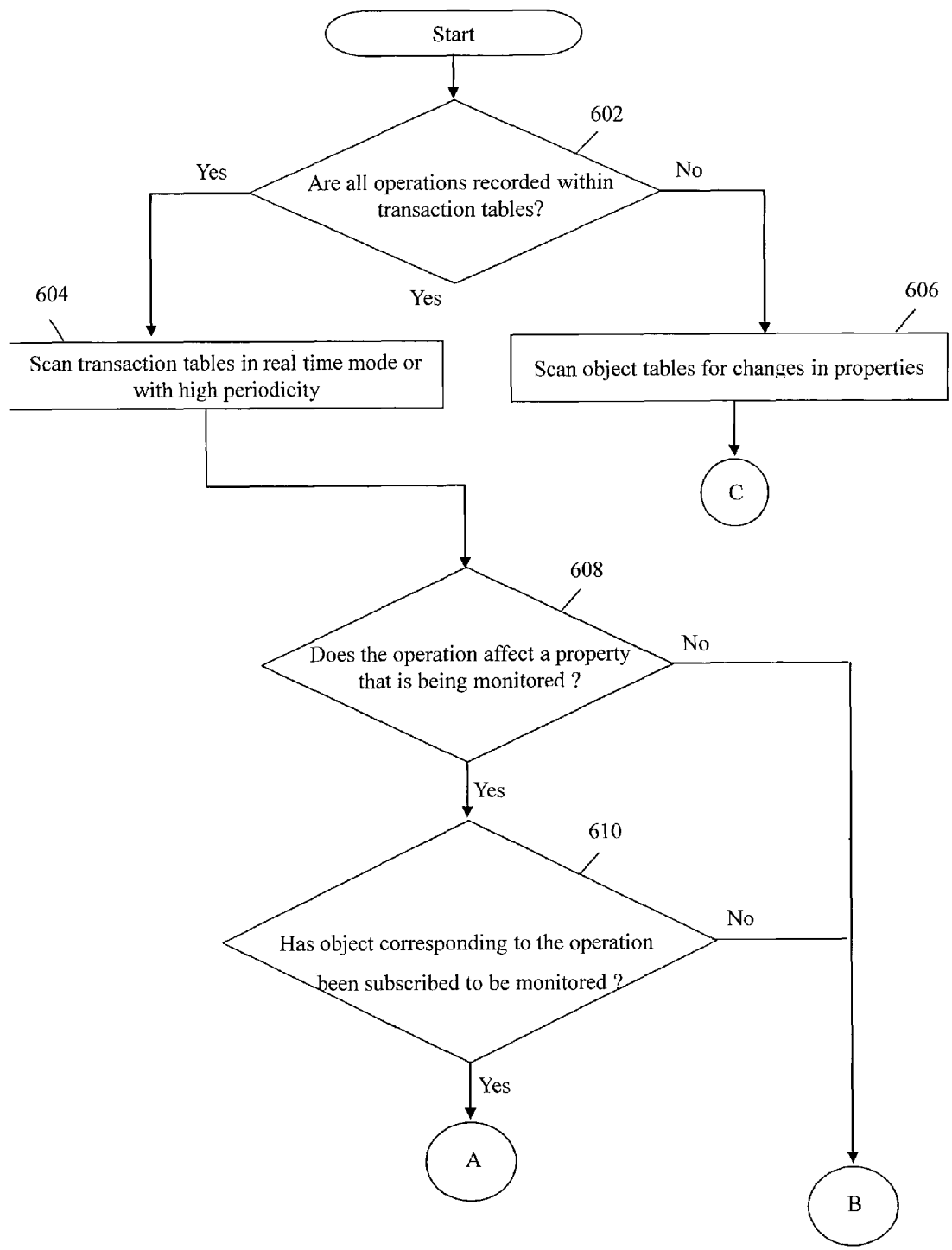
FIG. 6 shows a series of method steps carried out in accordance with an embodiment of the present invention for generating "Type D" alert messages.
Figure 6B:
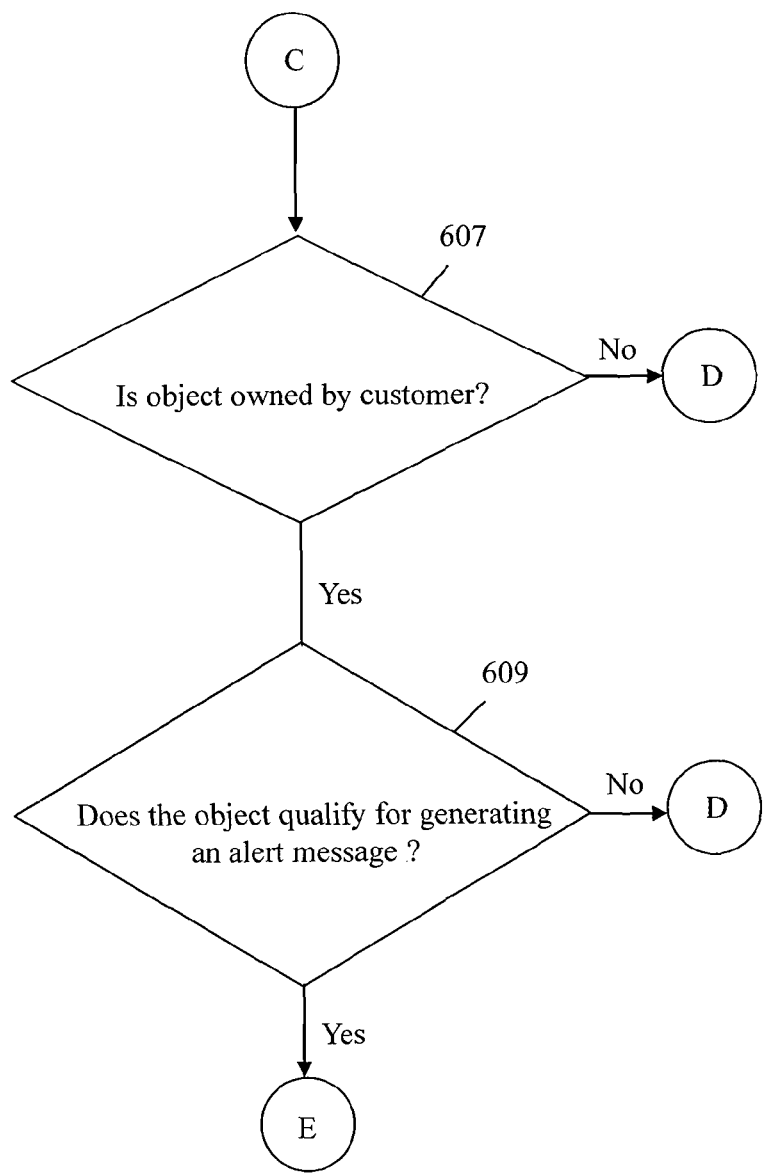
Figure 6C:
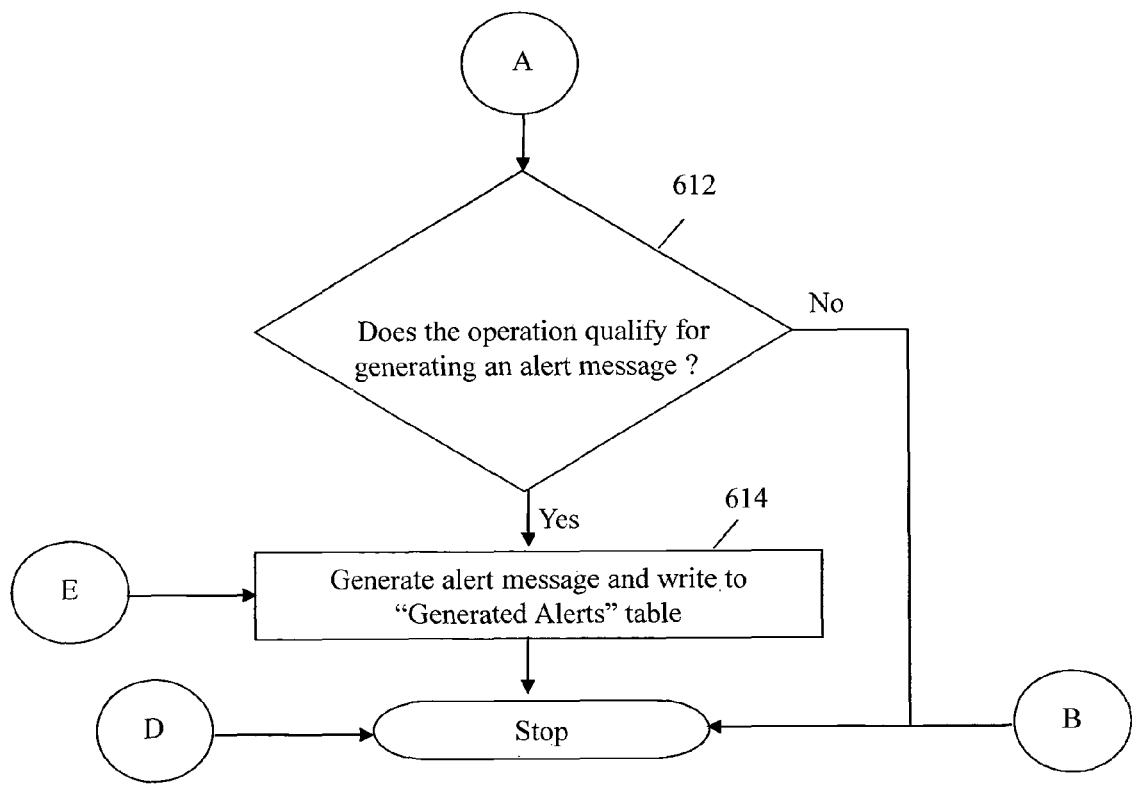

FIG. 6 shows a series of method steps carried out in accordance with an embodiment of the present invention for generating "Type D" alert messages. As mentioned earlier, "Type D" alert messages are generated whenever there is change in properties associated with an object. For the purpose of generating "Type D" alert messages, firstly at step 602, it is determined whether all operations performed on an object that result in change in properties associated with the object are recorded within transaction tables of an organizational database. An example of change in property associated with an object may include change in access profile of a customer associated with an object "Customer".

If it is established that all operations are recorded within transaction tables, then at step 604, the operations are scanned either in real time mode or with high periodicity. The operations are scanned in order to retrieve details of an operation which are then used to determine whether there is a change in property associated with the operation. Thereafter, at step 608 it is checked whether the operation affects a property that is being monitored as part of an alert message registration and subscription. For example, an operation "User logged on" may not affect a property "Access profile", which is being monitored for an alert message informing about a change in access profile of a customer, whereas the operation "User is enabled" may actually affect the property "Access profile".

If it is determined that a scanned operation affects a property that is being monitored, at step 610 it is determined whether the object on which the operation is being performed has been subscribed to be monitored by a customer. In other words it is determined whether the customer has subscribed to receive an alert message related to the operation in question. If, in another example, if the property being monitored is account balance and the operation performed is "cheque encashment", it needs to be checked if the account on which the cheque was being drawn is owned by the customer. Thereafter, at step 612 it is verified whether the operation qualifies for generating an alert message. This is done by first confirming customer identities and then checking that the monitored property passes required threshold values for monitoring. For example, after detecting a "cash withdrawal" operation on a monitored account, "account" record is accessed to check whether account balance is below the threshold limit set for the customer for minimum balance.

If it is established that the scanned operation qualifies for generating an alert message, then at step 614, an alert message corresponding to the operation is generated and written to "Generated Alerts" table and is marked "Ready to Dispatch" after personalizing it using output parameters and other preferences set during alert subscription.

In various embodiments of the present invention, if it is determined that all operations corresponding to change in properties are not recorded within transaction tables, then at step 606, object tables within the organizational database are scanned at periodicity determined during alert message registration. In an embodiment of the present invention, object tables are scanned in order to determine whether there is a change in property, such as, "change in access profile", since all operations that lead to such a change have not been recorded in transaction tables. Thereafter, at step 607, it is determined whether the object belongs to a customer. In an embodiment of the present invention, for determining whether the object belongs to the customer, identification of customer who owns the object is obtained and it is checked whether customer identification matches information entered during alert message subscription. Thereafter, at step 609, it is determined whether the object qualifies for generating an alert message. If it is determined that the object qualifies for generating an alert message, the flow proceeds to step 614 where an alert message is generated and written to "Generated Alerts" table and is marked "Ready to Dispatch" after personalizing it using output parameters and other preferences set during alert subscription.

Figure 7:
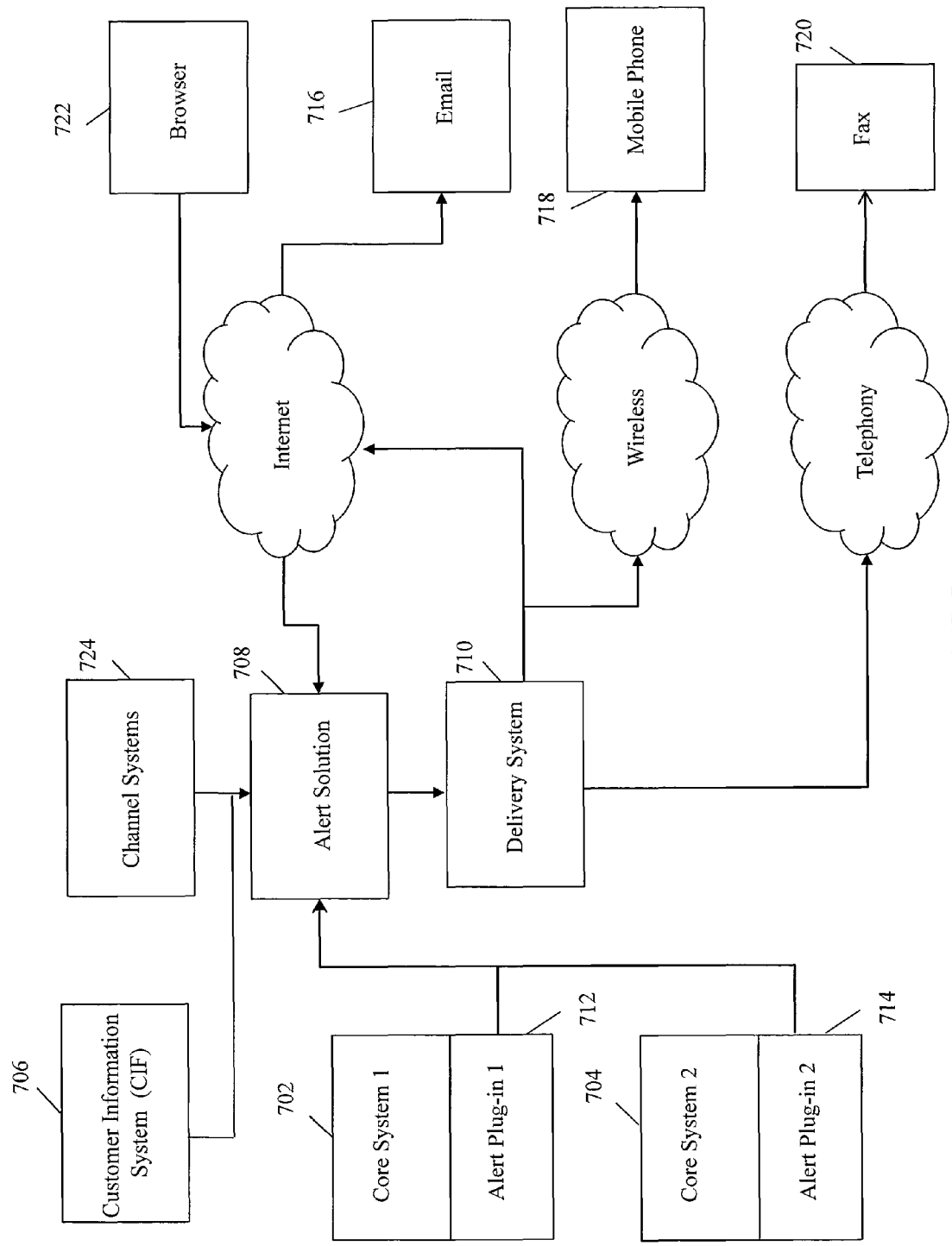
FIG. 7 illustrates a system depicting elements of the invention interconnected with each other and with system elements of an organizational database in order to integrate the functions of alert message registration, subscription, generation and delivery for an organizational process.

FIG. 7 illustrates a system 700 depicting elements of the invention interconnected with each other and with elements of an organizational IT system in order to integrate the functions of alert message registration, subscription, generation and delivery for an organizational process. As shown in the figure, an organizational IT system may include modules representing core systems executing primary processes within an organization, such as Core System 1 702 and Core System 2 704. The core systems are systems within an enterprise which work on objects that customers are interested in and for which a customer would like to receive alert messages. An example could be a credit card system that supports functions like goods purchase or cash withdrawal on credit cards which customers would like to know about. Another example could be health monitoring system which checks blood pressure or pulse rate of patients in an Intensive Care Unit (ICU), which doctors would be interested in.

In an exemplary embodiment of the present invention, an organization may have a number of core systems executing multiple processes related to varied fields. For example, in case of a financial company, examples of core systems may include, but are not limited to, Deposit System, Loan System, Trade Finance, Internet Banking, Mail System, User Inbox, Bill Payment and Presentment etc. In an embodiment of the present invention, each core system includes one or more objects on which there are transactions associated with the core system. Objects associated with a core system are represented by database objects in the IT system of an organization.

In an embodiment of the present invention, an organizational IT system further includes a Customer Information System (CIF) 706 that stores information about various relationships that a customer has with the organization and other identification information, such as mobile number(s), fax number(s), fixed-line number(s), email address and so on.

Primary elements of the invention comprises an alert solution module 708 that processes alert messages generated by processing systems and electronically communicates the messages to customers through delivery system 710. In an embodiment of the present invention, the alert solution module 708 retrieves customer information data stored in CIF 706. In an embodiment of the present invention, alert messages are generated by Alert plug-in modules associated with core systems. Each core system has an associated plug-in module that comprises software components configured to monitor objects and operations in transaction tables within organizational databases. As shown in the figure, Core System 1 and Core System 2 have respective plug-in modules, Alert Plug-in 1 712 and Alert Plug-in 2 714 that are configured to scan operations within transaction tables or object tables as the case may be depending on the type of alert message. Further, plug-in modules: Alert Plug-in 1 712 and Alert Plug-in 2 714 are configured to generate alert messages based on alert message registration and subscription information stored within their respective databases. In an embodiment of the present invention, alert message registration and subscription is performed by a customer through a Web browser-based interface 722. The Web browser-based interface 722 may be used by customers to retrieve pull-based alert messages. In an exemplary embodiment of the present invention, the Web browser based interface 722 is connected to the Alert Solution module 708 through an Internet network. Channel systems 724 represents an interface through which the alert solution module 708 is accessed by administrators using an intranet based browser interface.

Once alert messages are generated, the messages, are delivered to customers through communication channels such as, Email 716, Mobile Phone 718 and Fax 720 through the Delivery system 710. Delivery system 710 is a module comprising infrastructure for relaying generated alert messages on events to various communication channels through computer networks, such as, Internet, Wireless Networks, Telephony Networks etc. Further, in an embodiment of the present invention, alert messages also be pulled from Delivery System 710 by various communication channels. Mobile phone 718 may be used as a push channel for alert messages. Moreover, a customer may also request for subscription of alert messages or can pull alert messages through Mobile phone 718.

Figure 8:
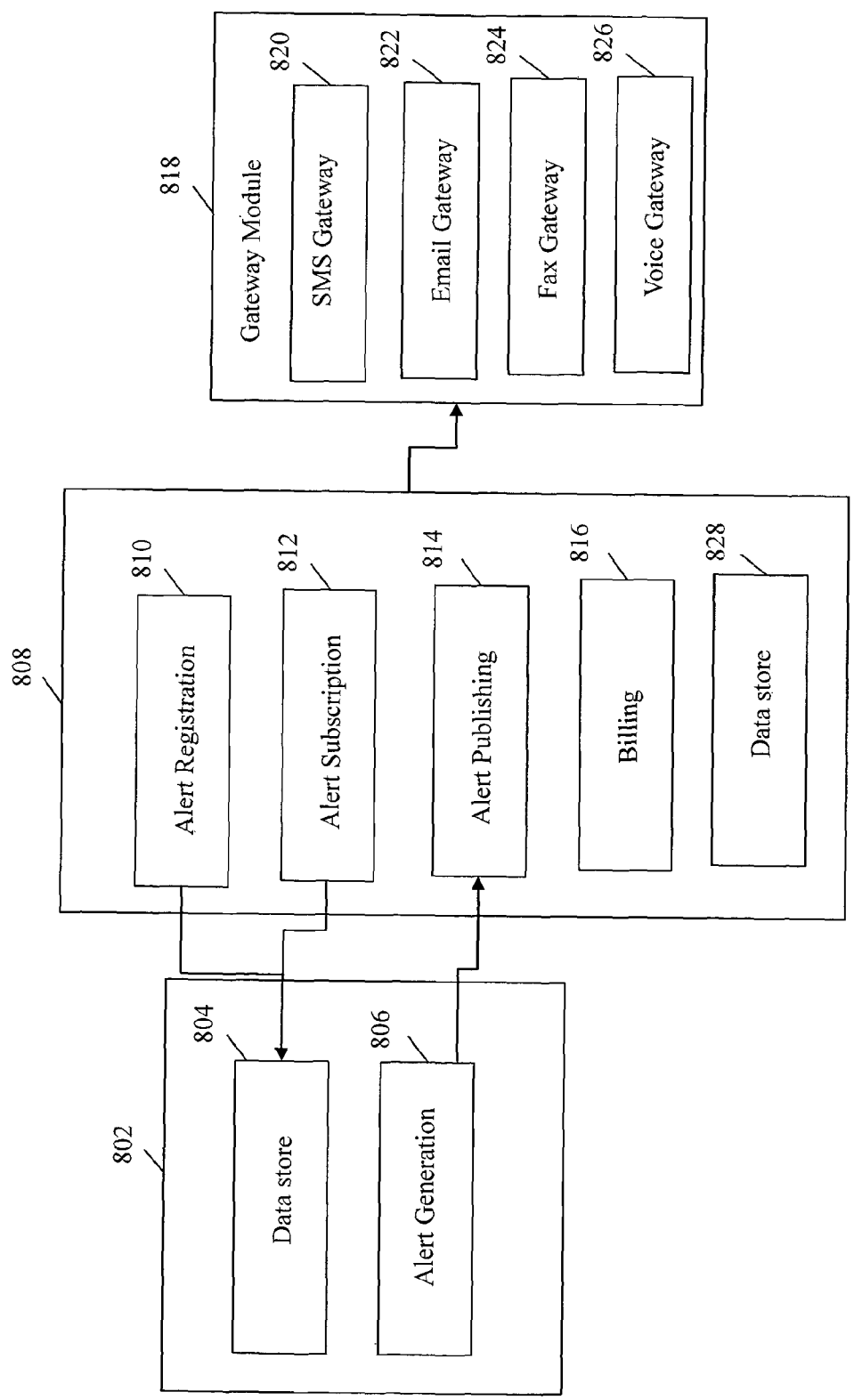
FIG. 8 illustrates sub-modules within system elements of the invention interacting with each other for facilitating registration, subscription and generation of alert messages, in accordance with an embodiment of the present invention.

FIG. 8 illustrates sub-modules within system elements of the invention interacting with each other for facilitating registration, subscription and generation of alert messages, in accordance with an embodiment of the present invention. As shown in the figure, Alert Plug-in Module 802 comprises a Data store 804 and an Alert Generation Module 806.

Alert Solution Module 808 comprises the following sub-modules: Alert Registration 810, Alert Subscription 812, Alert Publishing 814, Billing 816 and Data store 828. The modules Alert Registration 810 and Alert Subscription 812 provide user interfaces for performing message registration and subscription. Registration and subscription information is then stored in Data store 828. The registration and subscription information is also provided to Data store 804 in the Alert Plug-in Module 802 for the set of alert messages that will be generated by Alert Plug-in Module 802. In various embodiments of the present invention, the registration and subscription information is provided to data stores within each of the plug-in modules associated with core systems which are configured to generate alert messages.

In an embodiment of the present invention, after performing scanning of organizational database tables, Alert Generation Module 806 generates alert messages which are then sent to Alert Publishing Module 814. Alert Generation Module 806 uses registration and subscription information stored in Data store 804 for generating alert messages. Alert Publishing Module 814 is configured to publish and store generated alert messages to a database table within Data store 828 for delivery to customers.

Gateway module 818 comprises gateways: SMS Gateway 820, Email Gateway 822, Fax Gateway 824 and Voice Gateway 826 for sending alert messages through various communication channels such as Email, Fax, Mobile Devices etc.

In various embodiments of the present invention, the Billing Module 816 is configured to charge customers for alert messages that are generated and delivered. Various financial models are implemented by the Billing Module 816 for billing customers. Typical models include a flat fee per month/quarter/six month/yearly for unlimited alert messages to be sent to the customer or an alert message-based fee where each alert message sent to the customer is charged individually. Additional models used include a fixed number of free alert messages for a month/quarter/six month/year after which each alert message is charged. In an embodiment of the present invention, the Billing Module 816 is configured to post transactions to a banking system to debit the customer's primary account and credit the bank's charges account. Alternatively, the Billing Module 816 is configured to generate a report providing details of charges that need to be collected from each customer. This report could then be used as an input to a banking application to collect the charges from the customers.

FIGS. 9 and 10 depict browser-based user interfaces provided for performing alert message registration and subscription. As shown in FIG. 9, for registering an alert message, an administrator enters information including, but not limited to, alert message identification, alert message description, expiry period, priority, alert mode, file attachment, delivery channels, alert message subject, alert message etc. Further, as shown in FIG. 10, additional parameters/information is specified during alert message registration which can be subsequently used to generate alert messages. In an embodiment of the present invention, a user can specify preferences for receiving alert message, such as preference for delivery channels, frequency of receiving messages etc.

The method and system for providing electronic notification as described in the present invention or any of the embodiments, may be realized in the form of a computer system. Typical examples of a computer system include a general-purpose computer, a programmed microprocessor, a micro-controller, a peripheral integrated circuit element, and other devices or arrangement of devices that are capable of implementing the steps that constitute the method of the present invention.

The computer system typically comprises a computer, an input device, and a display unit. The computer typically comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions on the computer system.

The computer system executes a set of instructions that are stored in one or more storage elements to process input data. The storage elements may also hold data or other information, as desired, and may be an information source or physical memory element present in the processing machine. The set of instructions may include various commands that instruct the processing machine to execute specific tasks such as the steps constituting the method of the present invention.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A method for generating and providing electronic notifications, the method comprising:
    identifying, by an alert management computing device, one or more events corresponding to an organizational process from one or more databases associated with the organizational process, wherein identifying the one or more events includes identifying one or more objects associated with each of one or more core systems associated with the organizational process;
    scanning, by the alert management computing device, one or more operations or properties associated with each of the identified one or more objects;
    determining and recording, by the alert management computing device, one or more parameters associated with each of the scanned one or more operations or properties;
    registering, by the alert management computing device, a plurality of alert messages using one or more alert message attributes based on the determined one or more parameters;
    accepting, by the alert management computing device, subscriptions from one or more customers for receiving alert messages for the registered plurality of alert messages;
    sending, by the alert management computing device, relevant information comprising a list of identified one or more objects associated to each of the one or more core systems to generate alert messages based on the accepted subscriptions from the one or more customers, and wherein the relevant information further comprises one or more operations or property changes for generating the alert messages; and
    deleting, by the alert management computing device, one or more of the plurality of alert messages from a publication table that are beyond a specified alert message expiry period upon sending the generated alert messages.

2. The method of claim 1, wherein the relevant information corresponding to each of the one or more core systems comprises at least one of objects belonging to customers subscribed to receive alert messages, or customer specific values of input or output parameters.

3. The method of claim 1, wherein the scanning one or more operations or properties associated with each of the one or more objects further comprises one or more of:
    aggregating one or more operations occurring on a particular one of the one or more objects and recording a value associated with the one or more operations;
    predicting one or more operations by scanning object tables for identifying recorded dates and diary tables maintained by organizational databases; or
    identifying changes in properties associated with one or more of the one or more objects requiring an alert message.

4. The method of claim 1, further comprising:
    polling, by the alert management computing device, the database table to identify one or more generated alert messages;
    personalizing, by the alert management computing device, each identified alert message;
    extracting, by the alert management computing device, information related to delivery channels for sending each identified alert message
    sending, by the alert management computing device, each identified alert message to one or more of the delivery channels.

5. The method of claim 4, further comprising:
    assigning, by the alert management computing device, a priority value to each of the identified alert messages;
    consolidating, by the alert management computing device, one or more of the identified alert messages based on whether the identified alert messages are directed to a same channel address or are meant for a same customer; and
    sending, by the alert management computing device, the identified alert messages to one or more of the delivery channels based on the assigned priority values.

6. The method of claim 4 further comprising prior to the consolidating:
    writing, by the alert management computing device, the identified alert messages to one or more publication tables along with associated information required for sending alert messages, wherein the information includes a unique identifier for each message, type of alert message, alert message subscription identifier, customer identifier, delivery channel address, transformed alert message subject, file attachment location, alert message expiry period or priority of published alert message; and
    sorting, by the alert management computing device, the publication table in descending order of priority.

7. A non-transitory computer readable medium having stored thereon instructions for generating and providing electronic notifications comprising machine executable code which when executed by a processor, causes the processor to perform steps to and that further comprise:
    identify one or more events corresponding to an organizational process from one or more databases associated with the organizational process, wherein identifying the one or more events includes identifying one or more objects associated with each of one or more core systems associated with the organizational process;
    scan one or more operations or properties associated with each of the identified one or more objects;
    determine and record one or more parameters associated with each of the scanned one or more operations or properties;
    register a plurality of alert messages using one or more alert message attributes based on the determined one or more parameters;
    accept subscriptions from one or more customers for receiving alert messages for the registered plurality of alert messages;
    send relevant information comprising a list of identified one or more objects associated to each of the one or more core systems to generate alert messages based on the accepted subscriptions from the one or more customers, and wherein the relevant information further comprises one or more operations or property changes for generating the alert messages; and delete one or more of the plurality of alert messages from a publication table that are beyond a specified alert message expiry period upon sending the generated alert messages.

8. The medium of claim 7 wherein the relevant information corresponding to each of the one or more core systems comprises at least one of objects belonging to customers subscribed to receive alert messages, or customer specific values of input or output parameters.

9. The medium of claim 7 wherein the scanning one or more operations or properties associated with each of the one or more objects further comprises one or more of:
aggregate one or more operations occurring on a particular one of the one or more objects and recording a value associated with the one or more operations;
predict one or more operations by scanning object tables for identifying recorded dates and diary tables maintained by organizational databases; or
identify changes in properties associated with one or more of the one or more objects requiring an alert message.

10. The medium of claim 7 further comprises:
poll the database table to identify one or more generated alert messages;
personalize each identified alert message;
extract information related to delivery channels for sending each identified alert message;
send each identified alert message to one or more of the delivery channels.

11. The medium of claim 10 further comprises:
assign a priority value to each of the identified alert messages;
consolidate one or more of the identified alert messages based on whether the identified alert messages are directed to a same channel address or are meant for a same customer; and
send the identified alert messages to one or more of the delivery channels based on the assigned priority values.

12. The medium of claim 10 further comprises prior to the consolidating:
write the identified alert messages to one or more publication tables along with associated information required for sending alert messages, wherein the information includes a unique identifier for each message, type of alert message, alert message subscription identifier, customer identifier, delivery channel address, transformed alert message subject, file attachment location, alert message expiry period or priority of published alert message; and
sort the publication table in descending order of priority.

13. An alert management computing device, comprising:
a memory; and
a processor coupled to the memory and configured to execute programmed instructions stored in the memory to and that comprise:
identify one or more events corresponding to an organizational process from one or more databases associated with the organizational process, wherein identifying the one or more events includes identifying one or more objects associated with each of one or more core systems associated with the organizational process;
scan one or more operations or properties associated with each of the identified one or more objects;
determine and record one or more parameters associated with each of the scanned one or more operations or properties;
register a plurality of alert messages using one or more alert message attributes based on the determined one or more parameters;
accept subscriptions from one or more customers for receiving alert messages for the registered plurality of alert messages;
send relevant information comprising a list of identified one or more objects associated to each of the one or more core systems to generate alert messages based on the accepted subscriptions from the one or more customers, and wherein the relevant information further comprises one or more operations or property changes for generating the alert messages; and
delete one or more of the plurality of alert messages from a publication table that are beyond a specified alert message expiry period upon sending the generated alert messages.

14. The device of claim 13 wherein the relevant information corresponding to each of the one or more core systems comprises at least one of objects belonging to customers subscribed to receive alert messages, or customer specific values of input and output parameters.

15. The device of claim 13 wherein the scanning one or more operations or properties associated with each of the one or more objects further comprises one or more of:
aggregate one or more operations occurring on a particular one of the one or more objects and recording a value associated with the one or more operations;
predict one or more operations by scanning object tables for identifying recorded dates and diary tables maintained by organizational databases; or
identify changes in properties associated with one or more of the one or more objects requiring an alert message.

16. The device of claim 13 wherein the processor coupled to the memory is further configured to execute programmed instructions stored in the memory to and that further comprises:
poll the database table to identify one or more generated alert messages;
personalize each identified alert message;
extract information related to delivery channels for sending each identified alert message;
send each identified alert message to one or more of the delivery channels.

17. The device of claim 16 wherein the processor coupled to the memory is further configured to execute programmed instructions stored in the memory to and that further comprises:
assign a priority value to each of the identified alert messages;
consolidate one or more of the identified alert messages based on whether the identified alert messages are directed to a same channel address or are meant for a same customer; and
send the identified alert messages to one or more of the delivery channels based on the assigned priority values.

18. The device of claim 16 wherein the processor coupled to the memory is further configured to execute programmed instructions stored in the memory to and that further comprises, prior to the consolidating:
write the identified alert messages to one or more publication tables along with associated information required for sending alert messages, wherein the information includes a unique identifier for each message, type of alert message, alert message subscription identifier, customer identifier, delivery channel address, transformed alert message subject, file attachment location, alert message expiry period or priority of published alert message; and sort the publication table in descending order of priority.

\* \* \* \* \*